United States Patent
Van Brocklin et al.

(10) Patent No.: US 7,728,859 B2
(45) Date of Patent: Jun. 1, 2010

(54) OPTICAL PRINTHEAD

(75) Inventors: Andrew L. Van Brocklin, Corvalis, OR (US); Darwin M. Hanks, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 953 days.

(21) Appl. No.: 11/236,113

(22) Filed: Sep. 26, 2005

(65) Prior Publication Data

US 2007/0070175 A1 Mar. 29, 2007

(51) Int. Cl.
*B41J 2/435* (2006.01)
(52) U.S. Cl. .................................. 347/224
(58) Field of Classification Search ......... 347/224–225, 347/244, 258; 369/44.32, 47.51, 275.1, 283, 369/112.23–112.26, 73, 44.15; 422/82.05; 720/718; 428/64.4
See application file for complete search history.

(56) References Cited

U.S. PATENT DOCUMENTS

| | | | | |
|---|---|---|---|---|
| 3,636,526 | A | * | 1/1972 | Feinleib ........................ 365/120 |
| 4,410,968 | A | * | 10/1983 | Frohbach et al. ............ 369/44.39 |
| 5,105,408 | A | * | 4/1992 | Lee et al. .................... 369/44.15 |
| 5,248,992 | A | | 9/1993 | Ferschl |
| 5,767,483 | A | | 6/1998 | Cameron et al. |
| 5,828,644 | A | * | 10/1998 | Gage et al. ................. 369/112.24 |
| 6,275,250 | B1 | | 8/2001 | Sanders et al. |
| 6,392,683 | B1 | | 5/2002 | Hayashi |
| 6,417,879 | B2 | | 7/2002 | Hayashi |
| 6,771,297 | B2 | * | 8/2004 | Bronson ....................... 347/224 |
| 6,778,205 | B2 | | 8/2004 | Anderson et al. |
| 7,014,815 | B1 | * | 3/2006 | Worthington et al. ..... 422/82.05 |
| 7,050,387 | B2 | * | 5/2006 | Tsujita et al. ................. 369/283 |
| 7,270,865 | B2 | * | 9/2007 | Gore ............................ 428/64.4 |
| 2002/0191517 | A1 | | 12/2002 | Honda et al. |
| 2003/0108708 | A1 | | 6/2003 | Anderson et al. |
| 2003/0161224 | A1 | | 8/2003 | Anderson et al. |
| 2004/0037190 | A1 | * | 2/2004 | Suzuki et al. ............. 369/47.51 |
| 2004/0051778 | A1 | | 3/2004 | Bronson |
| 2004/0085885 | A1 | * | 5/2004 | Kikuchi et al. .......... 369/112.24 |
| 2004/0146001 | A1 | | 7/2004 | Koll et al. |
| 2004/0160510 | A1 | | 8/2004 | McClellan |
| 2004/0169717 | A1 | | 9/2004 | Bronson |
| 2004/0196354 | A1 | | 10/2004 | Hansen et al. |
| 2004/0202067 | A1 | * | 10/2004 | Pate et al. ................. 369/44.32 |
| 2004/0224041 | A1 | * | 11/2004 | Morishima ..................... 425/73 |
| 2006/0013116 | A1 | * | 1/2006 | Matsuishi et al. ......... 369/275.1 |
| 2006/0026622 | A1 | * | 2/2006 | Valley et al. ................. 720/718 |
| 2006/0245081 | A1 | * | 11/2006 | Mahony ...................... 359/726 |

FOREIGN PATENT DOCUMENTS

| | | |
|---|---|---|
| EP | 1450366 | 8/2004 |
| WO | WO 93/04444 A1 | 3/1993 |
| WO | WO 2004067289 | 8/2004 |

OTHER PUBLICATIONS

International Search Report for PCT/US2006/028902, Hewlett-Packard (3 pages).

* cited by examiner

*Primary Examiner*—Hai C Pham

(57) ABSTRACT

An optical printhead for a medium including material that forms an optically visible spot in response to energy of a predetermined wavelength, the optical printhead includes a laser configured to impart energy of the predetermined wavelength to the material through a fixed-focus lens arrangement.

28 Claims, 5 Drawing Sheets

OPTICAL PRINTHEAD

BACKGROUND

Conventional optical data storage devices are configured to read digital data from and write digital data to a removable optical disc. Currently, writable compact discs (CD-R) and re-writable compact discs (CD-RW) are popular formats for personal computers and other like devices. Re-writable digital versatile discs (DVDs), known as DVD-RAMs (random access memory), DVD-R, DVD-R/W, etc., have also become popular as the price of the applicable DVD drive devices has become more affordable.

The process of writing data to an optical disc is often referred to as "burning" the disc, since a beam from a write laser is used to selectively raise the temperature of certain materials within the optical disc such that the materials are altered in some manner. Consequently, features are formed on the disc. These features represent binary data values, i.e., 1's and 0's, which can subsequently be detected (read) using a read laser. After burning in a CD-R, for example, the user may decide to label the CD-R disc to reflect the data files that have been stored on the disc.

The LightScribe™ printing system developed by the Hewlett-Packard Company of Palo Alto, Calif. is a direct disc labeling technology that produces optically visible text and graphics on the surface of a CD or DVD disc media using the disc drive's laser and a specially coated LightScribe disc. A LightScribe disc drive writes data (on the data side of the disc) and creates optically visible labels (on the label side of the disc) with the same drive, and may use the same laser for both operations by flipping the disc over after writing the digital data in order to create the label. Using laser technology, LightScribe's specially coated discs chemically change when a laser strikes its label side with energy of a particular wavelength, producing optically visible marks that can be arranged to form titles and graphics using LightScribe software. One embodiment of a suitable coating is described in U.S. Patent Application Publication No. 2003/0108708 A1.

It would be useful to avoid having to flip a disc over in order to label it. It would also be useful to reduce the cost or complexity of a printhead for a disc drive.

BRIEF DESCRIPTION OF THE DRAWINGS

Detailed description of embodiments of the present disclosure will be made with reference to the accompanying drawings.

DETAILED DESCRIPTION

The following is a detailed description for carrying out embodiments of the present invention. This description is not to be taken in a limiting sense, but is made merely for the purpose of illustrating the general principles of the example embodiments of the present invention.

Figure 1:
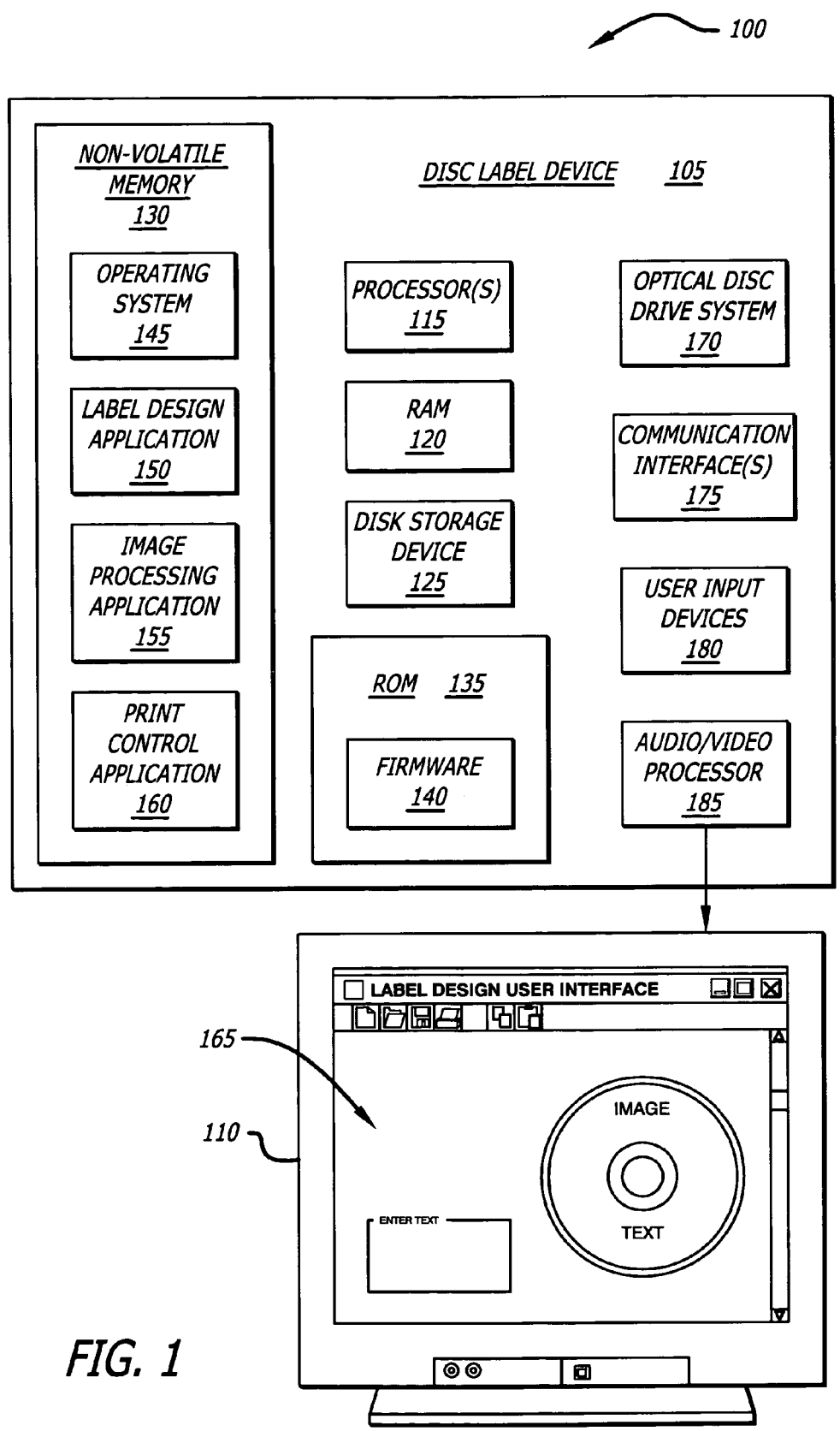
FIG. 1 shows an example embodiment of a disc media marking system according to an embodiment of the present invention.

FIG. 1 shows an example embodiment of a disc media marking system 100 suitable for implementation of the principles described herein. The marking system 100 includes a disc media marking (or labeling) device 105 and a display device 110. The disc media marking device 105 may be implemented as a stand-alone appliance device for labeling disc media. Alternatively, the disc media marking device 105 may be integrated as part of an optical media player/recorder or optical media drive, such as a compact disc (CD) player/recorder which is implemented to label an optical disc as well as record data onto a CD-R (CD recordable disc) and/or a CD-RW (CD-rewritable disc). Such writable CD devices may include, for example, a stand-alone audio CD player which is a peripheral component in an audio system. Similarly, the device 105 may be used in a DVD (digital versatile disc) player/recorder, such as may be used for making video recordings or converting videotapes to DVD. The device 105 may further be used in a CD and/or DVD drive integrated in a PC (personal computer), and other embodiments.

In this example embodiment, the disc media marking device 105 includes one or more processors 115 (e.g., any of microprocessors, controllers, and the like) which process various instructions to control the operation of the disc media marking device 105 and communicate with other electronic and computing devices. The disc media marking device 105 may be implemented with one or more memory components, examples of which include a random access memory (RAM) 120, a disc storage device 125, and non-volatile memory 130 (e.g., any one or more of a read-only memory (ROM) 135, flash memory, EPROM, EEPROM, etc.).

The disc storage device 125 may include any type of magnetic or optical storage device, such as a hard disc drive, a magnetic tape, a recordable and/or rewriteable compact disc (CD), a DVD, DVD+RW, and the like. The one or more memory components provide data storage mechanisms to store various information and/or data such as configuration information for the disc media marking device 105, graphical user interface information, and any other types of information and data related to operational aspects of the disc media marking device 105. Alternative implementations of the disc media marking device 105 may include a range of processing and memory capabilities, and may include any number of differing memory components than those shown in FIG. 1.

In this example embodiment, the disc media marking device 105 includes a firmware component 140 which is implemented as a permanent memory module stored on ROM 135, or with other components in the disc media marking device 105, such as a component of a processor 115. Firmware 140 is programmed and distributed with the disc media marking device 105 to coordinate operations of the hardware within the disc media marking device 105 and includes programming constructs used to perform such operations.

An operating system 145 and one or more application programs may be stored in a non-volatile memory 130 and executed on processor(s) 115 to provide a runtime environment. A runtime environment facilitates extensibility of the disc media marking device 105 by allowing various interfaces to be defined that, in turn, allow the application programs to interact with the disc media marking device 105. In this example, the application programs include a label design application 150, an image processing application 155, and a print control application 160.

The label design application 150 generates a label design user interface 165 for display on a display device 110 from which a user may create a label image to be rendered on a disc media, such as on an optical disc. A user may specify, or otherwise drag and drop text, a bitmap image for background, a digital photo, a graphic or symbol, and/or any combination thereof to create the label image on the user interface 165.

The image processing application 155 processes the label image created with the label design user interface 165 to produce a data stream of label image data and laser control data to control rendering the image on tracks of a disc media (i.e., an optical disc). For example, a continuous tone RGB (red, green, and blue) rectangular raster graphic of the label image may be converted, in one embodiment, to concentric circular tracks. The curved raster is color mapped and separated into the printing color channels, for example KCMY (black, cyan, magenta, and yellow), or grayscale. This data stream is formatted as laser control data and is augmented with other control commands to control the disc media marking device 105 rendering a label on the disc media.

A label file is generated which may be communicated to a controller where the label file is parsed to control a labeling mechanism. Alternatively, the tracks may be generated and streamed to the disc media marking device 105 one track at a time to utilize host processing with the device's rendering process.

The print control application 160 determines the radius of the first track and the subsequent track spacing. After the radius of the first track and the track spacing is determined, the print control application 160 determines which label image data will correspond to each respective track. In one embodiment, the laser mark locations along a particular track are specified in a coordinate system where the concentric circular tracks are defined in coordinates of the radial distance and the distance along each respective track.

The disc media marking device 105 includes an optical disc drive (ODD) subsystem 170 which may be implemented to mark on a surface of a disc media (i.e., optical disc), such as to render a label image on a label surface (i.e., label side) of an optical disc.

In this example embodiment, the disc media marking device 105 further includes one or more communication interfaces 175 which may be implemented as any one or more of a serial and/or parallel interface, as a wireless interface, any type of network interface, and as any other type of communication interface. A wireless interface enables the disc media marking device 105 to receive control input commands and other information from an input device, such as from a remote control device or from another infrared (IR), 802.11, Bluetooth, or similar RF input device. A network interface provides a connection between the disc media marking device 105 and a data communication network which allows other electronic and computing devices coupled to a common data communication network to send label image data and other information to the disc media marking device 105 via the network. Similarly, a serial and/or parallel interface provides a data communication path directly between the disc media marking device 105 and another electronic or computing device.

The disc media marking device 105 may include user input devices 180 which may include a keyboard, pointing device, selectable controls on a user control panel, and/or other mechanisms to interact with, and to input information to the disc media marking device 105. In this example embodiment, the disc media marking device 105 also includes an audio/video processor 185 which generates display content for display on the display device 110, and generates audio content for presentation by a presentation device, such as one or more speakers (not shown). The audio/video processor 185 may include a display controller which processes the display content to display corresponding images on the display device 110. A display controller may be implemented as a graphics processor, microcontroller, integrated circuit, and/or similar video processing component to process the images. Video signals and audio signals may be communicated from the disc media marking device 105 to the display device 110 via an RF (radio frequency) link, S-video link, composite video link, component video link, or other communication link.

Although shown separately, some of the components of the disc media marking device 105 may be implemented in an application specific integrated circuit (ASIC). Additionally, in various example embodiments, a system bus (not shown) connects the various components within the disc media marking device 105. A system bus may be implemented as one or more of any of several types of bus structures, including a memory bus or memory controller, a peripheral bus, an accelerated graphics port, or a local bus using any of a variety of bus architectures. Furthermore, the disc media marking device 105 may share a system bus with a host processor.

The principles described herein can be implemented in a variety of different printing system, for example, in the LightScribe printing system by Hewlett-Packard Company. LightScribe is a direct disc labeling solution that extends the capabilities of existing drive, media and software to labeling discs. In the LightScribe system, the drive is a printing or labeling device, i.e., it functions as the "printer". One example of such a device is described in U.S. Pat. No. 6,778,205, which is assigned to the assignee of the present invention.

Figure 2:
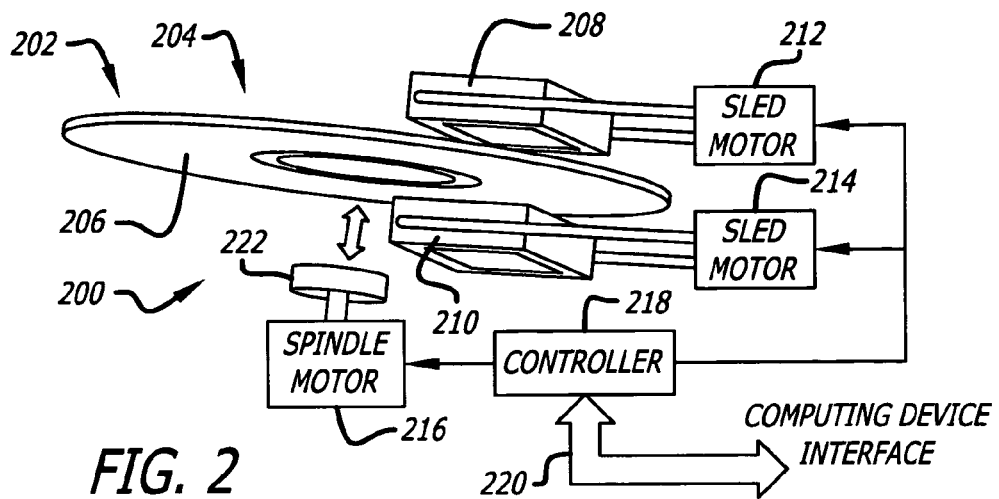
FIG. 2 shows an example embodiment of an optical disc drive apparatus including separate optical pickup units (OPUs) for a label side and a data side of a disc according to an embodiment of the present invention.

FIG. 2 shows an example embodiment of an optical disc drive apparatus 200 suitable for inclusion in the optical disc drive system 170 (FIG. 1). Also shown in FIG. 2 is a disc 202 with a label side 204 and a data side 206. The label side 204 includes a layer of material that undergoes a chemical reaction in response to energy of a particular wavelength, such as that provided by a laser. By way of example, the material includes a dye that becomes substantially transparent (or, for example, substantially opaque, or darker, or lighter) when heated to a sufficiently high temperature for a sufficiently long period of time by the energy of the particular wavelength. Energy of other wavelengths generally does not cause sufficient heating, or the chemical reaction, to occur.

In this example embodiment, the optical disc drive apparatus 200 includes optical pickup units (OPUs) 208 and 210 facing the label side 204 and the data side 206, respectively. In this example embodiment, OPUs 208 and 210 are separately and independently repositioned in relation to the disc 202 by sled motors 212 and 214, respectively. In this example embodiment, the optical disc drive apparatus 200 includes a spindle motor 216 and a controller 218, which can be provided with a computing device interface 220. The controller 218 (which can include one or more controllers, processors, or the like) is configured to control the sled motors 212 and 214 and the spindle motor 216, and can also be configured to provide control signals to the OPUs 208 and 210 as well as to perform various other functions such as calibration, measurement, and printing.

The controller 218 may be implemented as a printed circuit board employing a combination of various components discussed above with respect to the disc media marking system 100 of FIG. 1. Accordingly, controller 218 may include a processor for processing computer/processor-executable instructions from various components stored in a memory. The processor can be one or more of the processors 115 discussed above with respect to the disc media marking system 100. Likewise, the memory can be the non-volatile memory 130 and/or firmware 140 of disc media marking system 100.

In this example embodiment, the spindle motor 216 controls a rotational speed of the disc 202 via a spindle 222. The spindle motor 216 is operated in conjunction with the sled motor 212 and sled motor 214, to control coarse radial positioning of the OPUs 208 and 210 with respect to the disc 202. It should be appreciated that other mechanisms can be used for repositioning the OPUs 208 and 210 with respect to the disc 202 and vice versa.

In this example embodiment, during label marking the rotational speed of the disc 202 and the radial position of the OPU 208 are controlled such that laser marks are written on the disc 202 as the label side 204 moves past the laser beam (not shown in FIG. 2) at a constant linear velocity. A laser driver (or the like) implemented, for example, in the controller 218 controls the firing of the laser beam to write laser marks corresponding to a label image onto the label side 204. Additionally, in an example embodiment, the laser driver controls the intensity of the laser beam generated by the OPU 208 to read data maintained on the label side 204. The same or a different laser driver controls the firing and intensity of a laser which is generated by the OPU 210 and directed toward the data side 206 of the disc 202. It should be appreciated that the laser driver and other software components described herein can also be implemented as firmware or hardware components.

The computing device interface 220 interfaces the controller 218 with another electronic or computing device to receive label image data or a label file (not shown). The computing device interface 220 can be implemented as an ATAPI (Advanced Technology Attachment Packet Interface), which is one of many small computer parallel or serial device interfaces. Another common computer interface is SCSI (small computer system interface), which is a generalized device interface for attaching peripheral devices to computers. SCSI defines the structure of commands, the way commands are executed, and the way status is processed. Various other physical interfaces include the Parallel Interface, Fiber Channel, IEEE 1394, USB (Universal Serial Bus), and ATA/ATAPI. ATAPI is a command execution protocol for use on an ATA interface so that CD-ROM and tape drives can be connected via the same ATA cable with an ATA hard disc drive. ATAPI devices generally include CD-ROM drives, CD-recordable drives, CD-rewritable drives, DVD (digital versatile disc) drives, tape drives, super-floppy drives (e.g., ZIP and LS-120), and the like.

Figure 3:
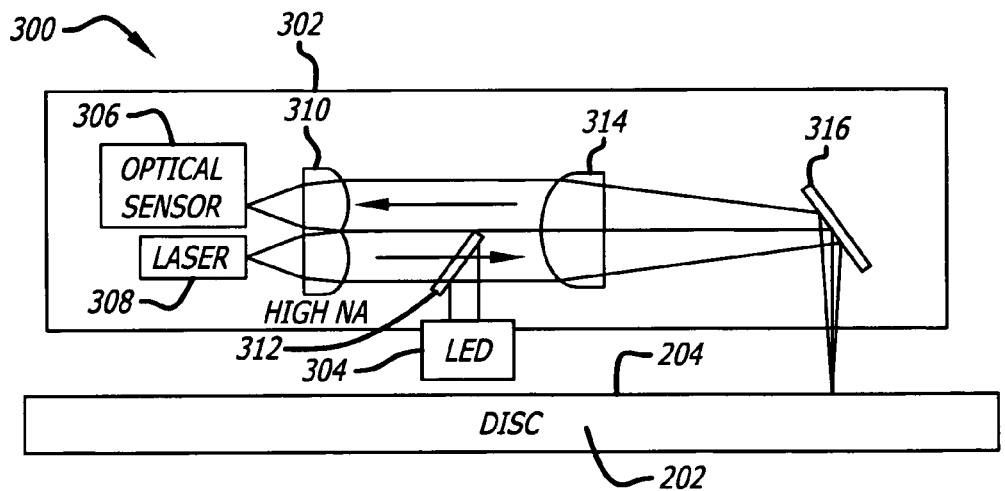
FIG. 3 shows an example embodiment of an optical printhead (OPH) for a label side of a disc according to an embodiment of the present invention.

FIG. 3 shows an example embodiment of an optical pickup head (OPH) 300 for a label side of a disc. The OPH 300 is suitable for inclusion in the OPU 208 (FIG. 2). In this example embodiment, the OPH 300 includes a housing 302, a light emitting diode (LED) or other light source 304, an optical sensor 306, a laser 308, a high numerical aperture (NA) lens 310, a dichroic mirror 312, a lens 314 and a mirror 316, configured as shown.

The laser 308 generates a laser beam of a particular wavelength (e.g., 780 nm) which is directed along an optical path through the high NA lens 310 and the lens 314, and reflected by the mirror 316 through an opening in the housing 302 to be incident upon the label side 204 of the disc 202 thereby creating laser-formed optically visible marks that correspond to label image data. In this example embodiment, the optical path does not include a mechanism for repositioning an objective lens in order to properly focus the laser beam on the label side 204. Nor does the optical path include a beamsplitter.

In an example embodiment, an apparatus, for a disc with a label side and a data side, the label side including material that forms an optically visible spot in response to energy of a predetermined wavelength, includes an optical printhead, a laser configured to impart energy of the predetermined wavelength, and means for fixing a focus of the energy in relation to the label side. In an example embodiment, the means for fixing a focus does not include a mechanism for repositioning an objective lens.

In an example embodiment, visible light generated by the LED 304 (e.g., a visible wavelength LED, for example 650 nm) or a laser, example wavelength 650 nm, is reflected by the dichroic mirror 312, directed through the lens 314, and reflected by the mirror 316 to be incident upon the label side 204 of the disc 202. Light reflected back from label side 204 is reflected by mirror 316, transmitted through lens 314 and the lens 310 with high NA on the object (sensor) side, and directed toward the optical sensor 306. In an example embodiment, the optical sensor 306 is used for reading the media ID and for optical power calibration (OPC). There is no need for a "focus" sensor. The dichroic mirror 312 and LED 304 provide illumination for the sensor 306 at a different wavelength from the laser 308. In an example embodiment, the LED wavelength is chosen such that a large signal will be returned for use in OPC. If 780 nm (the same wavelength used for marking) were to be used for OPC, then there would be very little difference in reflected light between marked and unmarked portions of the disk, since the 780 nm absorbing property of the disk is retained after marking. However, a human visible wavelength of light such as 650 nm (Red) provides a large decrease in reflectivity when media such as LightScribe media is marked. This is because the LightScribe media is designed to have high reflectivity across the visible spectrum before marking, and low reflectivity after marking. It should be understood that the principles described herein are not limited to use with a particular type or brand of media.

In this example embodiment, the optical sensor 306 is a "sum sensor". When the sum of measured irradiance directed at the sensor 306 is at a relative maximum, it is an indication that the laser beam is in focus on media and that media is present in the drive. When this optical assembly is moved over the media ID portion of the disc, the light reflected will correspond to the spokes and spaces of the media ID.

In an example embodiment, the optical sensor 306 is configured to read data (e.g., identification data) from the label side 204 when the label side 204 is illuminated by the LED 304. For example, data may be encoded in the form of a sequence of high and low reflectivity regions in a band near the inner diameter of the disk. By shining light on these regions and detecting the amount of reflected light, the data encoded can be determined In an example embodiment, the optical sensor 306 also provides outputs to the controller 218 (FIG. 2), for example, to facilitate an optical power calibration (OPC) function. Optical power calibration, in some embodiments, involves a process of making trial markings to a label surface, and then sensing certain characteristics of the written marks such as reflectivity by using the marking laser or a second laser or LED to illuminate the label surface and sensing the reflected light with a sensor. These sensed characteristics are then used to make adjustments to the power level of the marking laser in order to optimize the mark quality.

Figure 4:
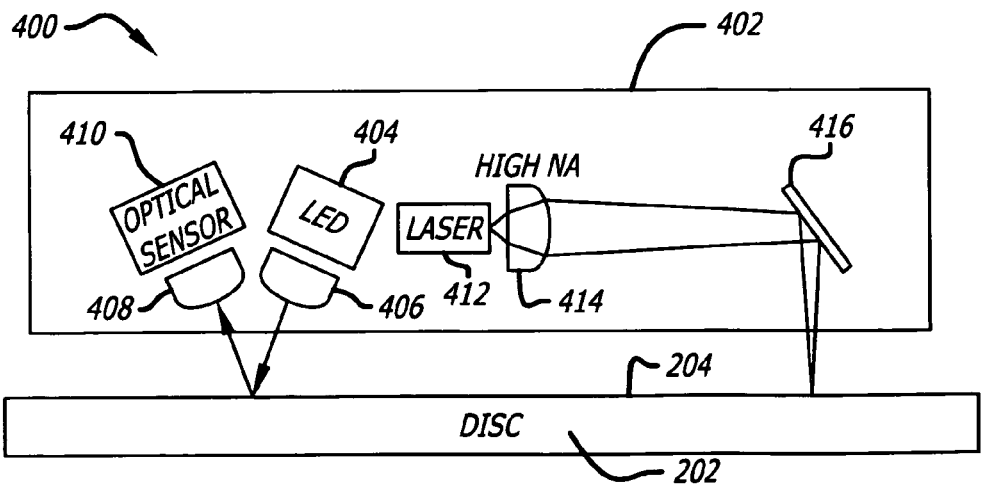
FIG. 4 shows another example embodiment of an OPH for a label side of a disc according to an embodiment of the present invention.

FIG. 4 shows another example embodiment of an OPH 400 for a label side of a disc. The OPH 400 is suitable for inclusion in the OPU 208 (FIG. 2). In this example embodiment, the OPH 400 includes a housing 402, a light emitting diode (LED) or other light source 404, lenses 406 and 408, an optical sensor 410, a laser 412, a lens 414 with a high numerical aperture (NA) on the object (laser) side and a mirror 416, configured as shown.

The laser 412 (e.g., a 780 nm laser) generates a laser beam which is directed along an optical path through the high object side NA lens 414, and reflected by the mirror 416 through an opening in the housing 402 to be incident upon the label side 204 of the disc 202 thereby creating optically visible laser marks that correspond to label image data. In this example embodiment, the optical path does not include a mechanism for repositioning an objective lens. Nor does the optical path include a beam splitter.

In an example embodiment, visible light generated by the LED 404 (e.g., a red LED having a wavelength of approximately 650 nm) is directed through the lens 406 to be incident upon the label side 204 of the disc 202. Light reflected back passes through the lens 408 and is directed toward the optical sensor 410, which can be used to read the media ID and to indicate that the disk is positioned correctly underneath the assembly. In this example embodiment, the optical sensor 410 can be a sum sensor (e.g., as previously described) or another type of sensor. In an example embodiment, the optical sensor 410 provides outputs to the controller 218 (FIG. 2), for example, to facilitate an optical power calibration (OPC) function. In an example embodiment, the optical sensor 410 is configured to read data (e.g., identification data) from the label side 204 when the label side 204 is illuminated by the LED 404.

In an example embodiment, an apparatus for a disc with a label side and a data side, the label side including a layer of material that undergoes a chemical reaction in response to energy of a particular wavelength, includes a light source (e.g., a light emitting diode (LED)) of a different wavelength configured to illuminate the label side without producing marks on the material, means for reading identification data from the label side when the label side is illuminated by the light source, and a laser configured to impart energy of the particular wavelength to the layer of material so as to produce optically visible marks. In an example embodiment, the apparatus further includes an optical pickup unit (OPU) facing the data side. In an example embodiment, the OPU is configured to determine, simultaneously with the identification data being read, a media type of the disc. In an example embodiment, the means for reading includes a sum sensor.

In an example embodiment, an optical printhead, for a medium including material that forms an optically visible spot in response to energy of a predetermined wavelength, includes a laser configured to impart energy of the predetermined wavelength to the material through a fixed-focus lens arrangement. In an example embodiment, the lens arrangement provides substantially uniform optical characteristics, such as, for example, spot size, for spots formed at any location on the medium. The substantially uniform spot size is somewhere in the range between 1 um and 100 um.

In an example embodiment, an optical printhead, for a disc with a label side and a data side, the label side including material that forms an optically visible spot in response to energy of a predetermined wavelength, includes a laser configured to impart energy of the predetermined wavelength to the material through a fixed-focus lens arrangement.

Figure 5A:
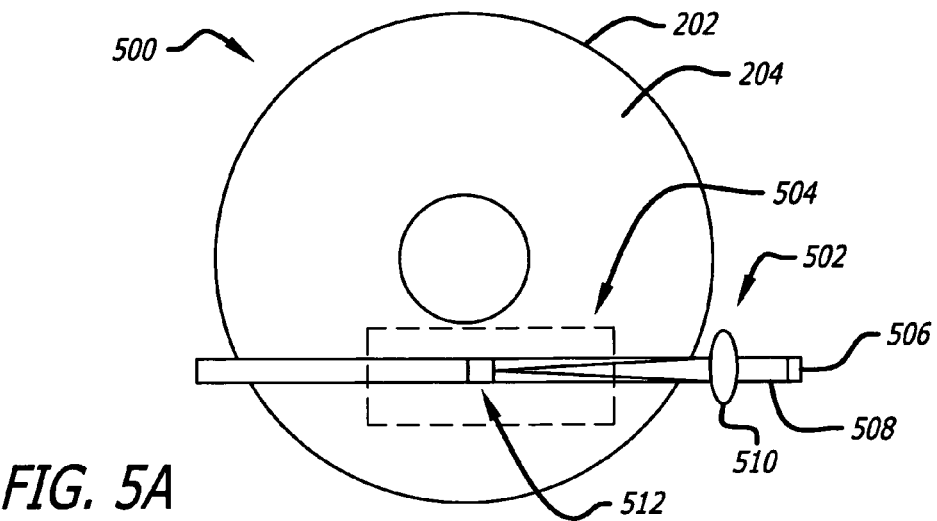
FIGS. 5A and 5B are top and side views respectively of an example embodiment of an optical disc drive apparatus with a label side OPH and a data side OPU according to an embodiment of the present invention.
Figure 5B:
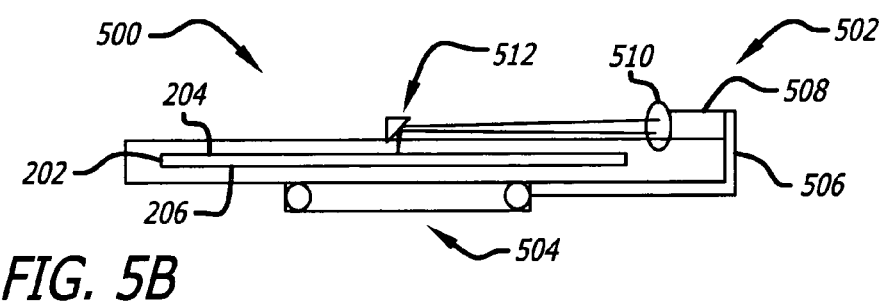

Referring to FIGS. 5A and 5B, in an example embodiment, an optical disc drive apparatus 500 includes a label side OPH 502 and a data side OPU 504. In this example embodiment, the optical disc drive apparatus 500 includes a mounting surface (or mechanism) 506 that wraps around attaching the label side OPH 502 to the data side OPU 504. In this fashion, a sled (in some embodiments associated with the data side OPU 504) can be used to move both the label side OPH 502 and the data side OPU 504. In this example embodiment, the label side OPH 502 includes a laser source 508 (e.g., a laser diode), a beam shaping lens 510 and a beam directing and sensing mechanism 512, configured as shown. As discussed below, the label side OPH 502 requires no focus, and is compact and inexpensive. Moreover, the label side OPH 502 can mount to an existing OPU 504 for positioning.

In an example embodiment, an apparatus for writing a disc with a label side and a data side includes an optical printhead adjacent the label side and including a laser configured to impart energy of a predetermined wavelength to the label side through a fixed-focus lens arrangement so as to form optically visible marks on the label side, and an optical pickup unit adjacent the data side and configured to write digital data to the data side. In an example embodiment, the apparatus further includes a mechanical coupling between the optical printhead and the optical pickup unit.

Figure 6:
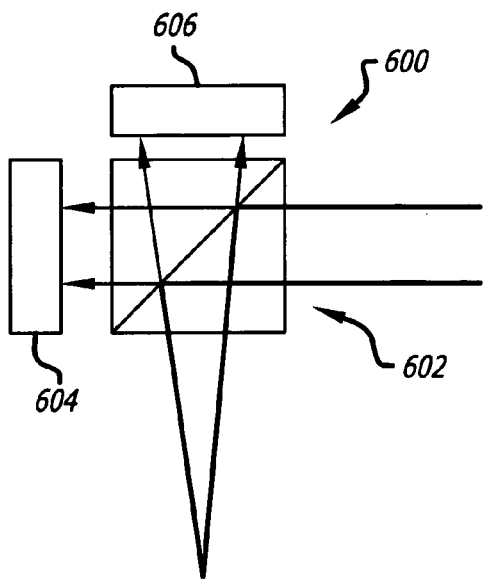
FIG. 6 shows an example embodiment of a beam directing and sensing mechanism that includes a partially-transmissive mirror according to an embodiment of the present invention.

Referring to FIG. 6, in an example embodiment, a beam directing and sensing mechanism 600 suitable for the label side OPH 502 includes a partially-transmissive mirror 602, a forward sense diode 604 and a reflection diode 606 (e.g., a sum sensor), configured as shown.

Figure 7:
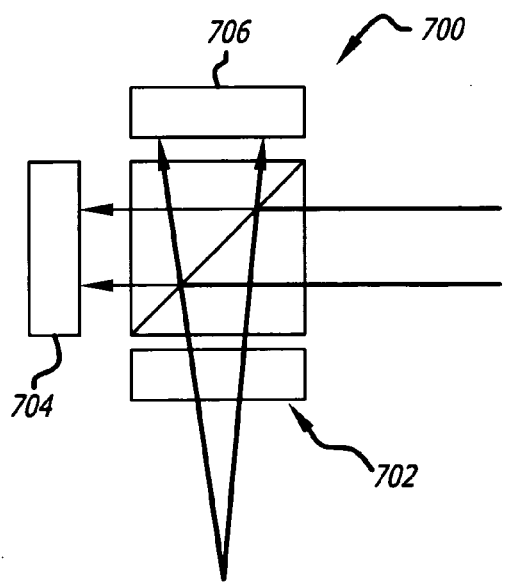
FIG. 7 shows an example embodiment of a beam directing and sensing mechanism that includes a polarized beam splitter and a ¼ wave plate according to an embodiment of the present invention.

Referring to FIG. 7, in another example embodiment, a beam directing and sensing mechanism 700 suitable for the label side OPH 502 includes a polarized beam splitter and a ¼ wave plate 702, a forward sense diode 704 and a reflection diode 706 (e.g., a sum sensor), configured as shown.

In an example embodiment, the label side OPH 502 is optimized for making optically visible marks on a label surface. In a typical optical disc drive there is a nominal distance of 50 mm between the edge of the disc, which would therefore be a worst case distance available to source a beam and converge it on the label surface. For example, if 2 mm is added for the distance that the beam would be above the label surface then after reflection onto the label surface there would be a total distance traversed of 52 mm. A reasonable beam width to achieve with collimating optics has a 2 mm diameter. From these dimension, the result is a convergence angle of arctan (1/52)=1.1 degree which equals a numerical aperture of sin(1.1)=0.019. With a 650 nm laser, this NA results in a FWHM spot size of 650 nm/0.019=34 um which is reasonable for a 600 dot per inch (dpi) marking system. The depth of focus is $(650 nm/(0.019)^2)$=1.8 mm which means there would be an allowed variation in distance between the printing surface and the laser source of +−0.9 mm which could be held mechanically and which means there would not be a need to actively focus. In an example embodiment, the depth of focus is between 100 µm and 2 mm. In an example embodiment, a focal length of the lens is approximately 70 mm +/−15 mm. In this example, a single lens 510 is used to capture the light exiting the laser diode 508 and bring it to a focus 52 mm from the lens 510. In an example embodiment, the laser beam is incident upon the partially-transmissive mirror 602 (or the polarized beam splitter) at an angle of approximately 45 degrees. In an example embodiment, the partially-transmissive mirror 602 (or the polarized beam splitter) is mounted near the focal point of the beam to redirect the beam to the label surface.

In this example embodiment, the label side OPH 502 provides a mechanism for sensing the outgoing power from the laser diode 508. Referring to FIG. 6, the forward sense diode 604 is mounted on the other side of the partially-transmissive mirror 602 (for example, a small percentage of the light, say 2%, passes through the mirror while the other 98% reflects off the mirror). This transmitted light is then captured by the forward sense diode 604.

The reflection diode 606 can be used to sense the light returning from the label surface for OPC or other read back purposes. In the foregoing example, this is accomplished by using the reflection diode 606 to capture the reflected light. In an alternative embodiment, the reflection diode 606 is eliminated, and the returning light is sensed by the back facet diode (not shown) in the laser cavity. Alternatively, and referring to FIG. 7, the polarized beam splitter and a ¼ wave plate 702 is configured with the forward sense diode 704 and a reflection diode 706 such that on the outbound and return trip from the disc the polarization of the light undergoes a 90 degree rotation and the splitter passes the majority of the light instead of reflecting it back to the laser source.

In an example embodiment, a print head can be made using a focused beam, a single reflecting surface, and one or two photodetectors, depending on whether the forward beam and/or reflected beam needs to be sensed. By angling the reflecting mirror appropriately the beam can be steered to the disc, where it reflects and then on return misses the reflecting mirror and hits instead a photodetector. If the mirror is made partially reflective (~98% for example), a second photodiode near the first can pick up a portion of the forward beam for laser power control.

Figure 8A:
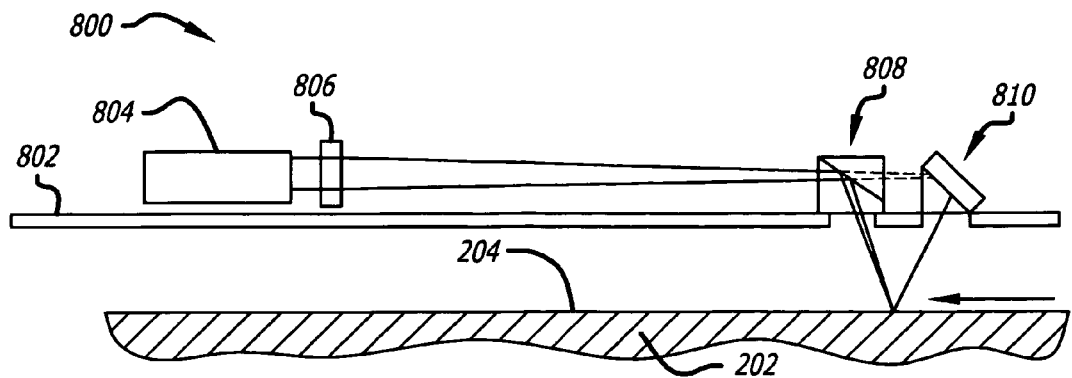
FIGS. 8A and 8B are top and side views respectively of an example embodiment of a disc labeling apparatus including a partially-transmissive mirror and forward and reflection sensing photodetectors according to an embodiment of the present invention.
Figure 8B:
Figure 9:
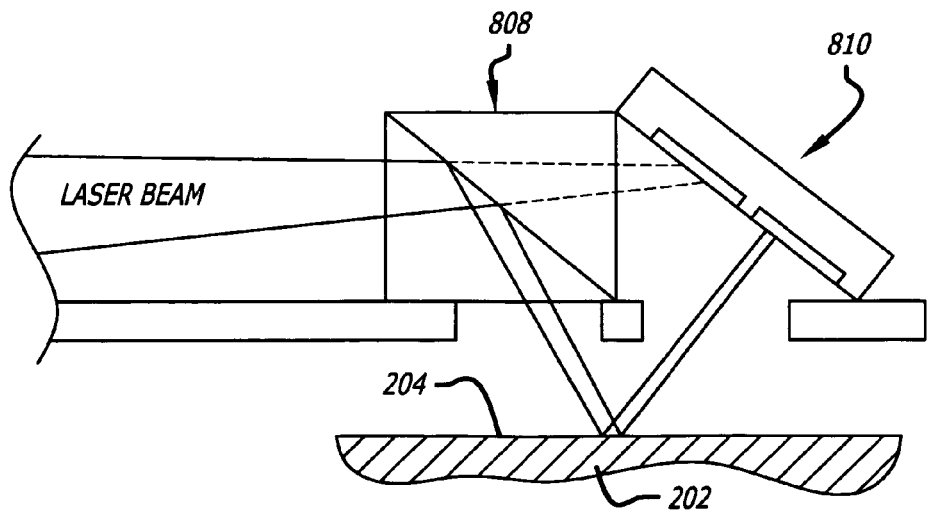
FIG. 9 is an enlarged view of the partially-transmissive mirror and forward and reflection sensing photodetectors of FIGS. 8A and 8B according to an embodiment of the present invention.

Referring to FIGS. 8A and 8B, in an example embodiment, a disc labeling apparatus 800 includes a supporting arm 802, a laser source 804, a shaping lens 806, a mirror (e.g., a partially-transmissive mirror 808) and a photosensor (e.g., forward and reflection sensing photodetectors 810), configured as shown. FIG. 9 is an enlarged view of the partially-transmissive mirror 808 and forward and reflection sensing photodetectors 810.

The disc labeling apparatus 800 provides both simplified optics and a mechanism for obtaining tracking information. In this example embodiment, the mirror is angled at a shallower angle such as 30 degrees instead of 45 degrees. As such the beam angle of incidence with the disc is not 90 degrees but approximately 60 degrees. Consequently, the beam does not reflect directly back along its original axis but instead reflects at an angle of approximately 120 degrees with the disc surface, missing the mirror and impinging instead on a photo detector that senses the amount of reflected light, a measurement that can be used for optimal power calibration (OPC) and media ID sensing purposes. In order to optionally detect incident light levels, the mirror can be made partially transmissive (2% for example), allowing a small portion of the incident light to pass and impinge on a second photodetector. This second photodetector may be part of a two element detector with the first photodetector by mounting the pair on an angled surface such that light from the incident path strikes the upper diode and light from the reflected path strikes the lower diode.

Figure 10A:
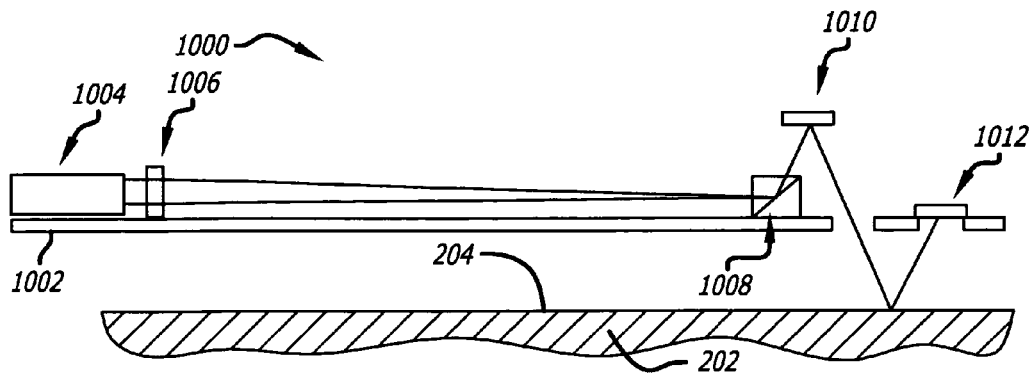
FIGS. 10A and 10B are side and top views respectively of an example embodiment of a disc labeling apparatus including a reflective grating for providing a tracking signal according to an embodiment of the present invention.
Figure 10B:
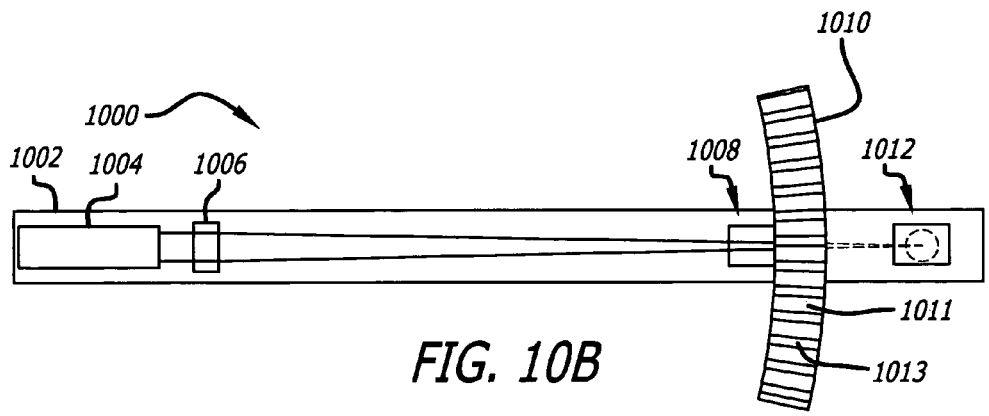

Referring to FIGS. 10A and 10B, in an example embodiment, a disc labeling apparatus 1000 includes a supporting arm 1002, a laser source 1004, a shaping lens 1006, a mirror 1008, a reflective grating 1010 and a reflection photodiode 1012, configured as shown. The disc labeling apparatus 1000 provides a mechanism for determining radial position. Instead of reflecting the incident light downward to the disc surface, the mirror 1008 is positioned to reflect light upward to the reflective grating 1010. In an example embodiment, the reflective grating 1010 is designed such that track centers 1011 are fully reflective, while in the regions 1013 between tracks the grating 1010 is non-reflective. The grating 1010 is attached to a fixed member such as the outer casing of the drive. As the arm moves rotationally with respect to the disc and the grating 1010, the light moves from high reflectivity to low reflectivity regions of the grating 1010 and back. The light reflected from the grating 1010 strikes the disc and then the reflected light photodetector 1012. The photodetector output is high when the grating 1010 is reflective, low when the grating 1010 is non-reflective, and somewhere in between when the beam strikes partway between the two types of surfaces. By detecting cycles of high and low output of the photodiode, track crossings can be counted and relative radial position can be tracked.

Figure 10C:
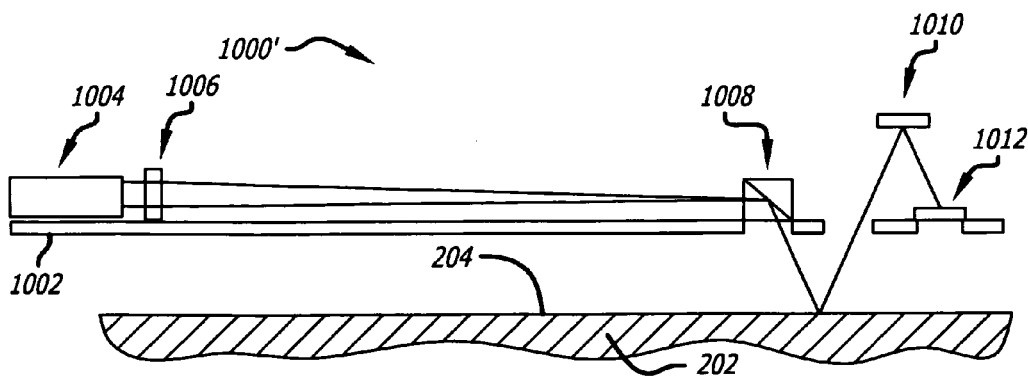
FIG. 10C is a side view of an alternate example embodiment of a disc labeling apparatus including a reflective grating for providing a tracking signal according to an embodiment of the present invention.

FIG. 10C shows an alternate example embodiment of a disc labeling apparatus 1000' which is similar to the disc labeling apparatus 1000 except that the mirror 1008 is instead configured as shown to reflect the laser beam toward the label side 204 such that the laser beam is reflected by the label side 204 toward the reflective grating 1010, and then reflected by the reflective grating 1010 toward the photodetector 1012.

In an example embodiment, an apparatus for a disc with a label side and a data side, the label side including a layer of material that undergoes a chemical reaction in response to energy, including a housing, a laser source for generating a laser beam, a reflective grating fixed in position in relation to the housing, a mirror for directing the laser beam toward the reflective grating, and a photodetector positioned to detect light reflected by the reflective grating for providing a tracking signal. In an example embodiment, the means for directing includes a mirror. In an example embodiment, the mirror is configured to reflect the laser beam directly toward the reflective grating. In an example embodiment, the mirror is configured to reflect the laser beam toward the label side such that the laser beam is reflected by the label side toward the reflective grating. In an example embodiment, the apparatus further includes an optical pickup unit (OPU) facing the data side.

In an example embodiment, a method includes providing a medium including material that forms an optically visible spot in response to energy of a predetermined wavelength, and imparting energy of the predetermined wavelength to the material through a fixed-focus lens arrangement. In an example embodiment, the method further includes Illuminating a label side of the medium with a light source, and reading identification data from the label side when the label side is illuminated by the light source. In an example embodiment, the method further includes determining, simultaneously with the identification data being read, a media type for the media. In an example embodiment, the method further includes generating an optical power calibration (OPC) signal in response to light reflected from the media. In an example embodiment, the method further includes measuring outgoing power of the energy. In an example embodiment, the method further includes sensing light returning from the media.

Although embodiments of the present disclosure have been described in terms of the example embodiments above, numerous modifications and/or additions to the above-described embodiments would be readily apparent to one skilled in the art. It is intended that the scope of the claimed subject matter extends to all such modifications and/or additions. The scope of the claimed subject matter is not limited to embodiments that include an optical disc drive.

What is claimed is:

1. An optical printhead for a medium including material that forms an optically visible spot in response to energy of a predetermined wavelength, the optical printhead comprising:
   a laser configured to impart energy of the predetermined wavelength to the material through a fixed-focus lens arrangement in which an objective lens of the fixed-focus lens arrangement is not repositionable,
   wherein the lens arrangement provides a substantially uniform spot size between 1 um and 100 um.

2. The optical printhead of claim 1, wherein the optical printhead includes a high numerical aperture (NA) at the laser.

3. The optical printhead of claim 1, wherein the fixed-focus lens arrangement does not include a beamsplitter.

4. The optical printhead of claim 1, wherein the laser includes a laser diode.

5. The optical printhead of claim 1, wherein the fixed-focus lens arrangement provides a depth of focus between 100 μm and 2 mm.

6. The optical printhead of claim 1, wherein the fixed-focus lens arrangement has a focal length of approximately 70 mm +/−15 mm.

7. The optical printhead of claim 1, wherein the predetermined wavelength is 780 nm.

8. An optical printhead for a disc with a label side and a data side, the label side including material that forms an optically visible spot in response to energy of a predetermined wavelength, the optical printhead comprising:
   a laser configured to impart energy of the predetermined wavelength to the material through a fixed-focus lens arrangement;
   a light source of a different wavelength from the predetermined wavelength configured to illuminate the medium without forming any optically visible spots; and,
   an optical sensor configured to read identification data from the label side when the label side is illuminated by the light source,
   wherein the material is responsive to the predetermined wavelength of energy but not other wavelengths of energy.

9. The optical printhead of claim 8, wherein the laser does not impart energy to the data side.

10. The optical printhead of claim 8, wherein the light source is a laser diode.

11. The optical printhead of claim 8, wherein the optical printhead is configured to determine, simultaneously with the identification data being read, a disc media type.

12. The optical printhead of claim 8, wherein the optical sensor includes a sum sensor.

13. The optical printhead of claim 8, comprising:
    an optical sensor configured to generate an optical power calibration (OPC) signal in response to light reflected from the disc.

14. The optical printhead of claim 8, wherein the laser generates a laser beam, the optical printhead further comprising:
    a partially-transmissive mirror positioned to reflect the laser beam toward the label side; and
    one or more photodetectors positioned to detect light transmitted through the partially-transmissive mirror for generating a measure of outgoing laser power and/or for sensing light returning from the label side.

15. The optical printhead of claim 14, wherein the laser beam is incident upon the partially-transmissive mirror at an angle of approximately 45 degrees.

16. The optical printhead of claim 14, further comprising:
    a lens adjacent to the laser through which the laser beam is passed.

17. The optical printhead of claim 8, wherein the laser generates a laser beam, the optical printhead further comprising:
    a polarized beam splitter and a ¼ wave plate configured to reflect the laser beam toward the label side when outbound from the laser source, and to pass the laser beam when reflected back from the disc; and
    one or more photodetectors positioned to detect light transmitted through the polarized beam splitter and ¼ wave plate for generating a measure of outgoing laser power and/or for sensing light returning from the label side.

18. The optical printhead of claim 17, wherein the laser beam is incident upon the polarized beam splitter at an angle of approximately 45 degrees.

19. The optical printhead of claim 17, further comprising:
    a lens adjacent to the laser through which the laser beam is passed.

20. The optical printhead of claim 8, wherein the laser generates a laser beam, the optical printhead further comprising:
    a partially-transmissive mirror positioned to reflect the laser beam toward the label side;
    a forward sensing photodetector positioned to detect light transmitted through the partially-transmissive mirror; and
    a reflection sensing photodetector positioned to detect light reflected by the partially-transmissive mirror and then by the label side.

21. An apparatus for writing a disc with a label side and a data side, comprising:
    an optical printhead adjacent the label side and including a laser configured to impart energy of a predetermined wavelength to the label side through a fixed-focus lens arrangement, in which an objective lens of the fixed-focus lens arrangement is not repositionable, and so as to form optically visible marks on the label side;
    an optical pickup unit adjacent the data side and configured to write digital data to the data side; and,
    an optical sensor configured to read identification data from the label side when the label side is illuminated.

22. The apparatus of claim 21, further comprising:
    a mechanical coupling between the optical printhead and the optical pickup unit.

23. A method, comprising:
providing a medium including material that forms optically visible spots in response to energy of a predetermined wavelength;
imparting energy of the predetermined wavelength to the material through a fixed-focus lens arrangement, in which an objective lens of the fixed-focus lens arrangement is not repositionable, and so as to form spots having substantially uniform optical characteristics;
illuminating a label side of the medium with a light source; and,
reading identification data from the label side when the label side is illuminated by the light source.

24. The method of claim 23, further comprising:
determining, simultaneously with the identification data being read, a media type for the media.

25. The method of claim 23, further comprising:
generating an optical power calibration (OPC) signal in response to light reflected from the media.

26. The method of claim 23, further comprising:
measuring outgoing power of the energy.

27. The method of claim 23, further comprising:
sensing light returning from the media.

28. An apparatus for a disc with a label side and a data side, the label side including material that forms an optically visible spot in response to energy of a predetermined wavelength, the apparatus comprising:
an optical printhead;
a laser configured to impart energy of the predetermined wavelength;
means for fixing a focus of the energy in relation to the label side via a fixed-focus lens arrangement in which an objective lens of the fixed-focus lens arrangement is not repositionable; and,
means for reading identification data from the label side when the label side is illuminated.

* * * * *